May 21, 1957  J. J. CHYLE  2,792,626
WELDING BACK-UP AND METHOD OF APPLYING THE SAME
Filed Oct. 15, 1952

INVENTOR.
JOHN J. CHYLE
BY *Andrus & Sceales*
ATTORNEYS

United States Patent Office 2,792,626
Patented May 21, 1957

2,792,626

WELDING BACK-UP AND METHOD OF APPLYING THE SAME

John J. Chyle, Wauwatosa, Wis., assignor to A. O. Smith Corporation, Milwaukee, Wis., a corporation of New York Application October 15, 1952, Serial No. 314,904

2 Claims. (Cl. 29—491)

This invention relates to welding and more particularly to a method and apparatus for supporting and forming molten weld metal during welding of a joint between adjacent ends of two metal articles.

An object of the present invention is to provide a backing strip to support the molten weld metal during welding which will fit snugly over an expandable chill ring and maintain alignment thereon as the chill ring is expanded.

Another object of the invention is to provide a glass fabric backing strip having the fibers thereof disposed in a manner to provide maximum circumferential stretch.

When welding adjacent ends of two tubular members, such as pipe sections, a metallic chill ring is usually applied to the underside of the joint between the adjacent ends of the members to support the weld metal. In addition a backing material is sometimes disposed on the supporting surface of the chill for the purpose of insulating the weld metal from the chill and for forming a smooth convex weld bead.

This invention is directed to the use of a glass fabric as a backing material. The glass fabric may be employed as a strip of braided tubing or woven cloth and is disposed in a generally circular shape with the ends thereof secured together to form a ring. The glass fibers which compose the fabric are disposed diagonally to the circumferential edges of the ring. The backing ring is applied to the outer surface of an expandable chill ring which is disposed within the pipe sections to be welded. The chill ring is expanded outwardly and the glass fiber backing ring is stretched and brought into contact with the underside of the joint between the adjacent ends of the pipe sections.

By using the glass fabric in the form of a continuous and integral ring there are no loose ends to contend with during the placing of the glass backing ring on the chill ring and the backing ring may be fitted snugly over the collapsed chill ring without any sag or play in the backing ring. As the glass fibers are disposed diagonally to the edges of the backing ring the ring will be stretched as the chill ring is expanded, so that the backing ring will at all times be maintained in proper alignment on the chill ring.

Other objects and advantages of the invention will appear in the course of the following description:

Figure 1:
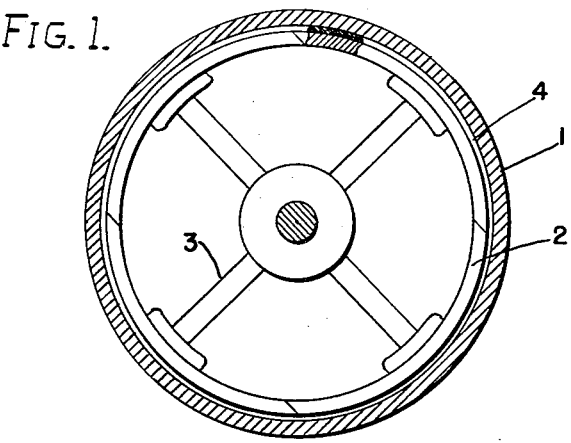
Figure 1 is a transverse section taken through one of the pipe sections to be welded showing the backing ring expanded into contact with the pipe section.
Figure 2:
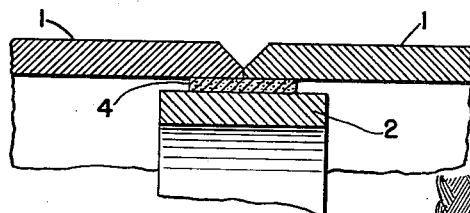
Fig. 2 is a fragmentary longitudinal section showing the placement of the backing ring and chill ring beneath the joint between pipe sections.

Referring to the drawing there is shown a backing apparatus for application to the underside of the joint between adjacent ends of two tubular members 1 such as pipe sections disposed in end to end relation to be welded together.

A chill ring 2 is disposed within the pipe sections and in alignment with the joint betwen adjacent ends thereof. Chill ring 2 may be formed of a number of arcuate segments and the joints between segments may be angular to permit the collapse and expansion of the chill ring.

Chill ring 2 is adapted to be expanded outwardly and contracted inwardly by an expandable fixture 3 which is sown schematically in the drawings.

To support the molten weld metal during welding a flexible inert backing material is disposed on the outer surface of chill ring 2 and is adapted to bear against the underside of the joint between adjacent ends of pipe sections 1. The backing material takes the form of a strip of fibrous glass fabric 4 which is formed in a generally circular shape with the ends thereof secured together to form a ring. The term strip refers to the glass fabric in a flat tape form or in the form of a tube, the latter being a very convenient form to use in the present application. The ends of the strip 4, not shown, may be secured together in a lapped or scarfed manner by sewing or the like.

Figure 3:
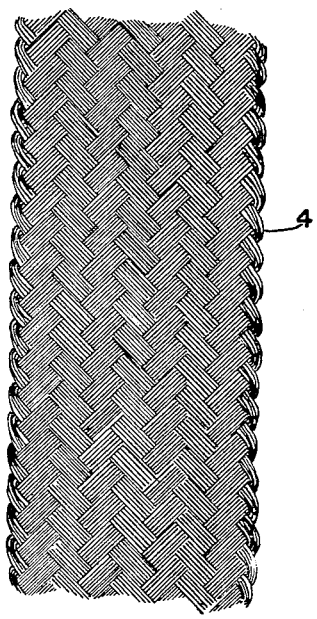
Fig. 3 is a top plan view of braided glass fiber in the natural unstretched state as applied to the collapsed chill ring.
Figure 4:
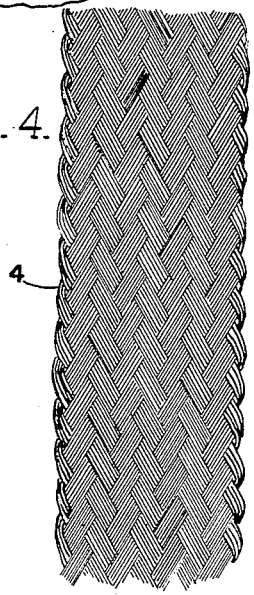
Fig. 4 is a top plan view of the braided glass fiber of Fig. 3 in a stretched condition.

To provide strip 4 with a degree of stretchability the fibers which compose the strip extend diagonally to the side edges thereof. It has been found that if fibers are disposed substantially parallel to or normal to the side edges of strip 4 very little stretch in the fabric will occur. The greatest amount of circumferential stretch can be obtained if the fibers are disposed at an angle of about 45° to the side of the strip. Figs. 3 and 4 show the fibrous glass fabric with the fabric in the natural unstretched state in Fig. 3 and in the stretched state in Fig. 4.

In operation, fixture 3 in the collapsed position is disposed within one of the pipe sections and aligned within the end to be welded. The glass fabric 4 in the form of a ring is then placed around the chill ring 2 and fits snugly about the chill ring with a minimum of slack or play in the fabric. A second pipe section is then brought into an end to end relation with the fixed pipe section and the glass fabric ring is aligned beneath the joint between adjacent ends of the pipe sections.

The fixture is then expanded, causing the fabric ring 4 to stretch and bear against the joint. The pipe sections are then in condition to be welded together.

By employing the glass fabric in the form of an integral ring the fabric may be conveniently disposed about the chill ring 2. The fabric ring is also preferably designed with a diameter so that it will fit snugly about the chill ring when the chill ring is in the collapsed position so that there will be a minimum of slack or excess fabric to contend with.

As the fibers are disposed diagonally to the circumferential edge of the fabric ring, the ring will be expanded with the chill ring and the fabric ring will be maintained across the joint and on the chill ring during the expansion. In its stretched supporting position the fabric will have the proper tension to provide the necessary fabric density to permit the molten weld metal to sink into the fabric and produce a smooth convex under-bead.

Various embodiments of the invention may be employed within the scope of the following claims.

I claim:

1. A welding back-up assembly for application to the underside of a joint between adjacent ends of two tubular members disposed in an end-to-end relation and adapted to be welded together which comprises, a radially expansible chill ring adapted to be disposed within the members in alignment with the joint, a fibrous glass backing ring disposed snugly around the outer surface of the chill ring when in the contracted position with the side edges of the backing ring being free of confinement, said backing ring consisting of a network of interwoven glass fibers disposed diagonally to the side edges of said backing ring to effect a substantial circumferential stretch of said backing ring on expansion of said chill ring, and means for expanding said chill ring to stretch said backing ring and bring said backing ring into contact with said joint under a predetermined degree of tension.

2. A method of welding the joint between adjacent ends of two tubular members disposed in an end-to-end relation comprising, tightly fitting a continuous fibrous glass backing ring on the outer surface of an expandable chill ring when the chill ring is in the contracted position, said backing ring consisting of a network of interwoven glass fibers disposed diagonally to the side edges of said backing ring to effect a substantial circumferential stretch of said backing ring on expansion of said chill ring, disposing the chill ring within the tubular members in alignment with the joint to be welded, expanding the chill ring to correspondingly expand the backing ring in diameter and thereby force said backing ring into contact with said members on either side of said joint, and thereafter welding the joint.

References Cited in the file of this patent

UNITED STATES PATENTS

| | | |
|---|---|---|
| 2,321,308 | Miller | June 8, 1943 |
| 2,331,689 | Hodge | Oct. 12, 1943 |
| 2,331,937 | Schreiner | Oct. 19, 1943 |
| 2,362,505 | Smith | Nov. 14, 1944 |
| 2,393,530 | Harris | Jan. 22, 1946 |